July 24, 1951    C. A. BICKEL    2,561,724
APPARATUS FOR OPERATING LATHES
Filed March 11, 1946    4 Sheets-Sheet 1
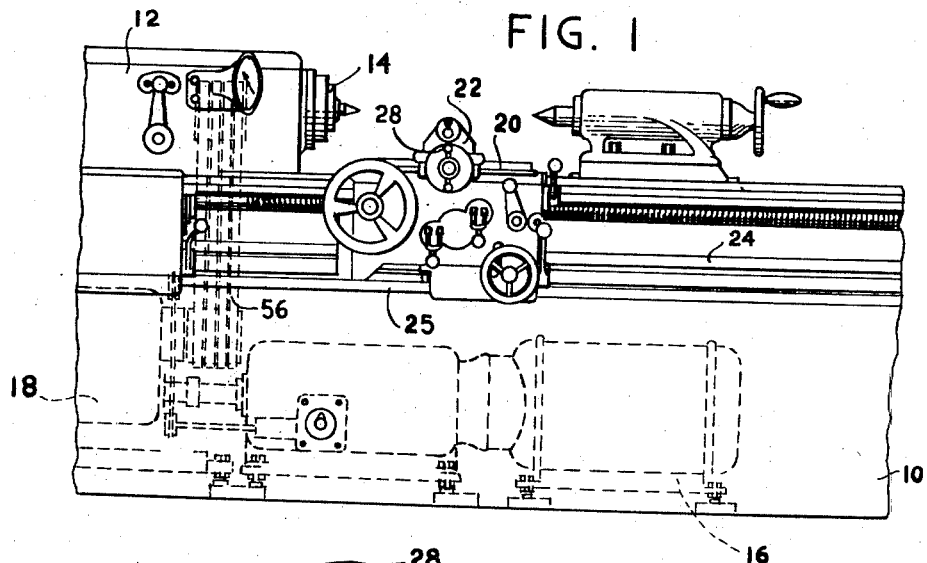
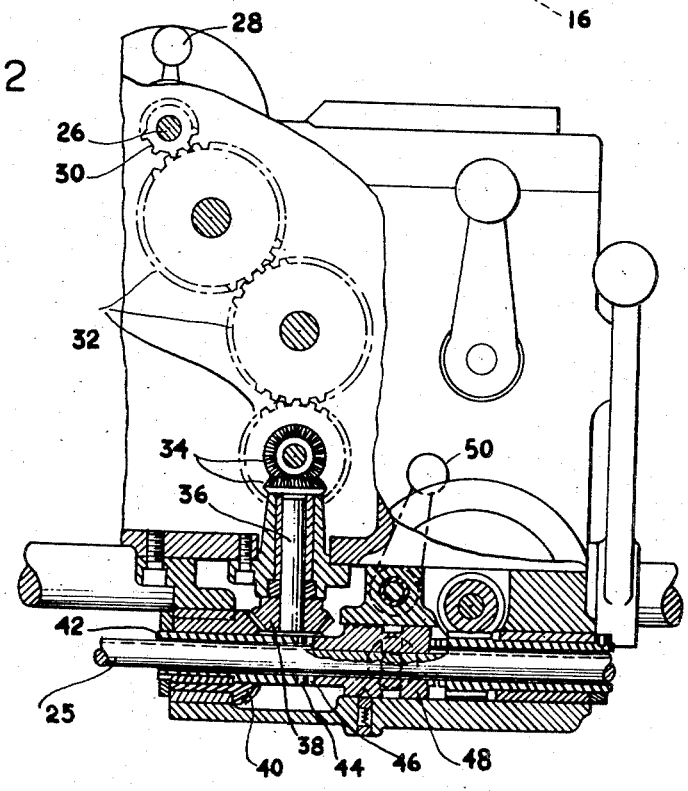
INVENTOR
CLIFFORD A. BICKEL
BY
Toulmin & Toulmin
ATTORNEYS July 24, 1951  C. A. BICKEL  2,561,724
APPARATUS FOR OPERATING LATHES
Filed March 11, 1946  4 Sheets—Sheet 2

INVENTOR
CLIFFORD A. BICKEL
BY
Toulmin &Toulmin
ATTORNEYS

July 24, 1951

C. A. BICKEL 2,561,724

APPARATUS FOR OPERATING LATHES

Filed March 11, 1946

INVENTOR
CLIFFORD A. BICKEL
BY
Toulmin & Toulmin
ATTORNEYS

July 24, 1951

C. A. BICKEL 2,561,724

APPARATUS FOR OPERATING LATHES

Filed March 11, 1946

INVENTOR
CLIFFORD A. BICKEL
BY *Toulmin & Toulmin*
ATTORNEYS

Patented July 24, 1951

2,561,724

UNITED STATES PATENT OFFICE 2,561,724

APPARATUS FOR OPERATING LATHES

Clifford A. Bickel, Sidney, Ohio, assignor to The Monarch Machine Tool Co., Sidney, Ohio, a corporation of Ohio Application March 11, 1946, Serial No. 653,657

9 Claims. (Cl. 82—2)

This invention relates to machine tools and particularly to lathes or cutting machines in which the surface speed of the workpiece is maintained substantially constant.

In the turning of metals, there is generally an optimum speed to which the workpiece and the tool move relatively in order to produce the best and most efficient results. Thus, a workpiece of a certain metal and having a certain diameter will rotate at one speed in order to have a predetermined surface speed relative to the tool, while another workpiece of a smaller diameter and of the same material will have to rotate at a higher speed in order to maintain the same cutting speed. Also, as the cutting tool moves inwardly in cutting a workpiece, the speed of the workpiece must be increased in order to maintain the cutting speed substantially constant.

The cutting speeds of different metals varies with the material, the type of cut being taken and other particular circumstances. Accordingly, it is desirable to be able to select a spindle speed which will give a predetermined surface speed to the workpiece and thereafter to maintain the said surface speed substantially constant.

If the workpiece is to be turned from a large diameter to a small diameter, then the change in speed from the beginning of the cut to the end thereof will be considerable and, in certain instances, it is desirable to make the adjustment of the spindle speed by means of more than one variable mechanism whereby each of the said mechanisms may be designed in a simple manner to have only a limited range of speed.

Accordingly, it is a primary object of the present invention to provide a means for maintaining the surface speed of a workpiece carried in a spindle substantially constant as the cutting tool moves radially thereof.

Another object is to provide means for maintaining the surface speed of a workpiece carried in a spindle substantially constant and to employ a plurality of variable mechanisms for accomplishing this result.

Another object is to provide means for maintaining the surface speed of a workpiece substantially constant by providing both electrical and mechanical transmissions of variable speed which are simultaneously adjusted.

Still another object is to provide a machine tool having a spindle and a cutting tool in which there is provided a mechanism for maintaining a surface speed of the workpiece substantially constant and in which the said surface speed may be manually adjusted independently of the controlling means therefor.

A particular object of the present invention is to provide apparatus adapted for use in connection with machine tools such as a lathe in which the speed of an electric motor which drives the spindle is adjusted to maintain the surface speed of the workpiece constant and in which there is a geared transmission which permits manual adjustment of the spindle speed from one speed range to another.

Another object of this invention is to provide in connection with a lathe or other machine tool having a spindle in which the spindle speed is adjusted to maintain the surface speed of the workpiece constant, an improved arrangement for actuating the speed controlling mechanism.

These and other objects and advantages become more apparent upon reference to the following specification taken together with the accompanying drawings in which:

Referring to the drawings:

Figure 1 is an elevational view of a lathe in which is to be embodied this invention;

Figure 2 is a fragmentary view of the lathe of Figure 1 showing a portion of the apron and the mechanism for clutching the cross-slide feed screw to a control rod for power actuation of the latter;

General arrangement

Figure 3:
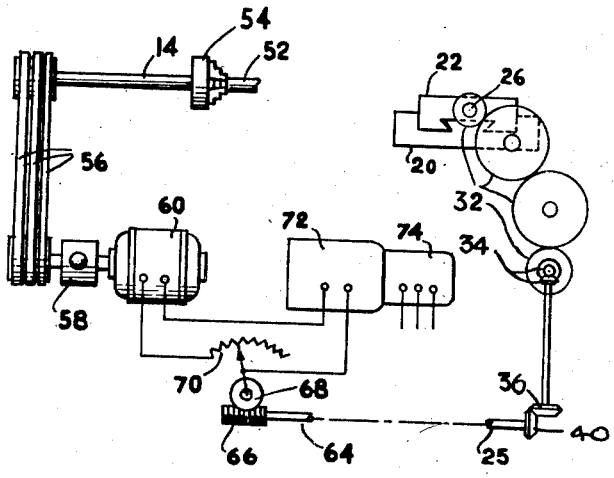
Figure 3 is a diagrammatic view illustrating one form of my invention wherein the speed of the spindle driving motor is adjusted in accordance with the position of the cross-slide.

According to this invention there is provided a spindle such as in a lathe which supports a workpiece in rotation while a mechanism such as a lathe cross-slide supports a cutting tool for movement toward and away from the axis of the workpiece.

Suitable means are provided for driving the spindle and other means, such as the conventional lathe feed rod, are provided for supplying power to drive the tool supporting cross-slide toward and away from the workpiece. Preferably, manual means are provided for adjusting the cross-slide relative to the work independently of the power means.

In order to maintain the cutting speed at the surface of the workpiece substantially constant, there are provided means connected to be operated by the movement of the cross-slide and arranged to adjust the speed of the spindle. In one form of this invention, the movement of the cross-slide operates to adjust a rheostat suitably arranged in the circuit of an electric drive motor for the spindle so that the speed of the said motor is a measure of the position of the cross-slide relative to the workpiece. An adjustable mechanical transmission between the motor and the spindle is provided so that different ranges of spindle speed may be selected.

According to another form of this invention, the movement of the cross-slide radially of the workpiece adjusts a rheostat to determine the spindle drive motor speed and also adjusts a mechanical transmission simultaneously so that neither the electric motor nor the mechanical transmission need be adjusted beyond their practical speed limits.

Still another form of this invention utilizes the radial movement of the cross-slide relative to the workpiece to adjust orifice means to regulate the fluid pressure that acts on a fluid operable means connected with an adjustable transmission which is arranged in the spindle drive and which, when adjusted, varies the speed of rotation of the spindle. By this arrangement, the fluid circuit and fluid operable means act as an amplifier and release power for adjusting the said transmission. This form of the invention also includes manual means whereby the speed of an electric drive motor may be adjusted and also includes an additional mechanical transmission which is manually adjustable, the said motor adjustment and additional mechanical transmission providing means for pre-selecting a wide range of spindle speeds.

In still another form of this invention the spindle driving motor receives power from a generator and the speed of the spindle is controlled by adjusting the relative field strengths of the said motor and generator by rheostats or other suitable mechanism which are adjusted in accordance with the position of the lathe cross-slide. As in the case of the other forms in the invention, there is also provided a manually adjustable mechanical transmission for selecting different speed ranges for the spindle.

*Structural arrangement*

Referring more particularly to the drawings, there is illustrated in Figure 1 a lathe having a bed 10 on which is mounted a headstock 12 having a spindle 14 which supports workpieces in rotation. The spindle is driven from a source of power generally indicated at 16 and preferably mounted in the bed and which may include a variable speed transmission indicated at 18.

Slidably mounted on the lathe bed is a carriage 20 that includes a cross-slide 22 which is movable toward and away from the axis of a workpiece carried by the spindle 14. The lathe preferably includes a feed rod at 24 which is driven from the spindle or from the source of power at 16 and which extends through the apron of the carriage 20 as shown in Figure 2. The feed rod provides a power for driving the carriage longitudinally of the lathe bed and also provides a source of power for driving the cross-slide in either direction. In the usual manner the feed rod may be clutched or unclutched from the carriage or cross-slide to provide a selective power drive thereto.

The cross-slide 22 includes a screw 26 which has fastened thereto or which is arranged to be clutched in engagement with a handwheel 28 for selectively adjusting the position of the cross-slide manually.

The screw 26 also carries a gear 30 which is in engagement through a gear train 32 with one of a pair of bevel gears at 34, the other of which is carried on a shaft 36. The shaft 36 extends toward a control rod 25 and carries a bevel gear 38 adjacent the control rod 25 which is in mesh with another bevel gear 40 which is keyed to a sleeve 42 that is freely rotatable on the said rod. The sleeve 42 has formed on the right end thereof teeth 44 which are engageable with the teeth 46 on a member 48 that is reciprocable in the apron in order selectively to engage or disengage the said teeth. The member 48 is keyed to rotate with the rod 25 so that by manipulating the member 48 by the lever 50 the rod 25 may be selectively clutched or unclutched with the shaft 36 in order to drive the said rod by the screw 26. The control rod 25 is thereby rotated in accordance with the actuation of the cross-slide.

In Figure 3 the essential parts of the lathe of Figure 1 are more or less diagrammatically shown, and connected therewith is the control system of the present invention. In Figure 3 the lathe spindle at 14 is shown as mounting a workpiece 52 as by the chuck 54. The spindle 14 is driven by belts 56 from the output shaft of an adjustable mechanical transmission 58 which is driven by an electric motor 60.

The cutting tool is mounted on the cross-slide 22 which is reciprocable on suitable ways in the carriage 20. The cross-slide screw 26 has connected therewith the gear train 32 which drives through the rod 25 into an output shaft 64 on which is mounted the worm gear 66 which is in driving engagement with the worm wheel 68.

The worm wheel 68 is operatively connected to adjust the speed of the spindle and is shown in Figure 3 as being connected with the movable portion of an adjustable rheostat 70 which is connected between the motor 60 and the generator 72 that supplies electrical energy to the said motor. The rheostat may be connected in either the armature or field circuit of the motor or may be provided with more than one resistance element in order to adjust both the armature and field currents. The generator 72 is connected to be driven by a motor 74 which may be supplied with power in any suitable and well-known manner.

Figure 4:
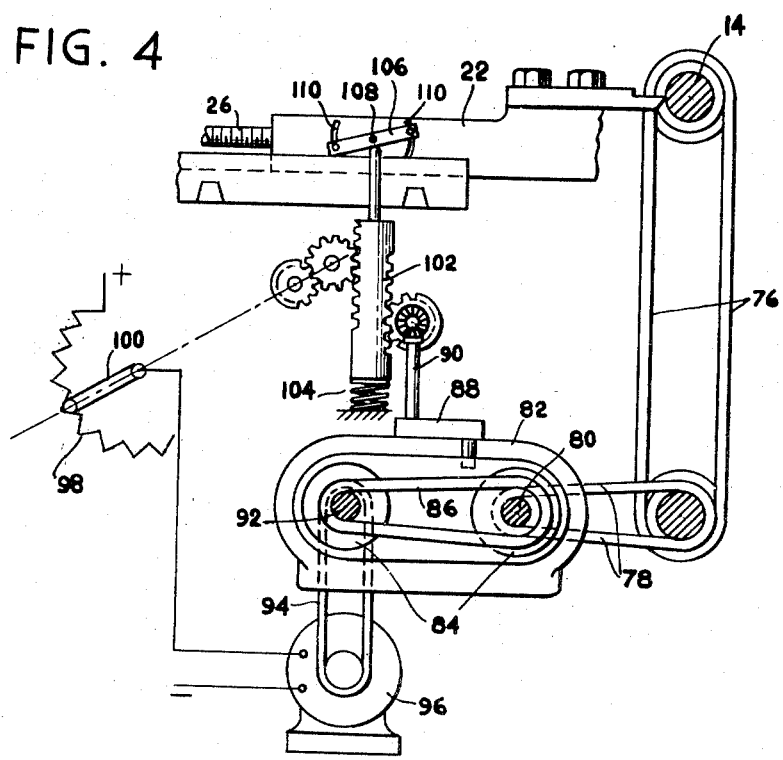
Figure 4 is a view of a modified form of my invention wherein there is a mechanical variable speed transmission which is adjusted simultaneously with the adjustment of the electric motor.

In operation, the cross-slide 22 is adjusted to bring the tool into operative association with the workpiece and the transmission at 58 is adjusted to provide for the proper surface speed of the workpiece. Thereafter, as cutting of the workpiece proceeds, movement of the cross-slide 22 through its screw 26 is operable, by means of the gear train 32, the worm and wheel at 66 and 68, and the rheostat 70, to maintain the surface speed of the workpiece substantially constant. The spindle speed may be adjusted to a different speed range at any time by manipulating the variable speed transmission at 58, this transmission and the one shown at 18 in Figure 1 being functionally equivalent as regards the speed range adjustment.

Where the adjustment of spindle speed between its highest and lowest rates is such as to be beyond the limits of an ordinary transmission or the usual type of variable speed electric motor, the construction shown in Figure 4 may be employed. In Figure 4, the spindle 14 is driven by the belts 76 and 78 from the output shaft 80 of a variable speed transmission 82 which may include the pulleys 84 over which run the belts 86. The pulleys 84 are simultaneously adjustable in opposite senses by a means indicated at 88 and including the rotatable shaft 90. Power is supplied to the input shaft 92 of the transmission 82 by a belt 94 that is driven from the output shaft of a motor 96. The motor 96 is preferably a variable speed motor and has included in circuit therewith a rheostat 98 which is adjustable by the member 100.

The member 100 and the shaft 90 are connected through suitable gearing with the double sided rack 102 that is continuously urged upwardly by a spring 104. For adjusting the double sided rack 102 to adjust the rheostat 98 and the transmission 82, the cross-slide 22 carries an adjustable bar 106 which may be pivoted at 108 and which is angularly adjustable about the said pivot as by means of the slots 110. The bar 106 engages a suitably shaped end on the rack 102 and vertically adjusts the rack as the cross-slide 22 moves toward and away from the axis of the workpiece. The angle of the bar may be adjusted in order to obtain the proper cutting speed at any setting of the tool and may also comprise a non-linear rack actuating surface if found desirable.

In operation, after the cross-slide has been adjusted and the bar 106 set to the proper angle, the drive motor 96 is energized to drive the spindle in rotation. Thereafter, actuation of the cross-slide by the screw 26 is effective to reciprocate the rack 102 in order simultaneously to adjust both the rheostat 98 and the transmission 82. This simultaneous adjustment of the motor speed and the speed of the output shaft of the transmission 82 is effective to vary the speed of the spindle 14 in order to maintain the cutting speed at the surface of the workpiece at the proper value.

Figure 5:
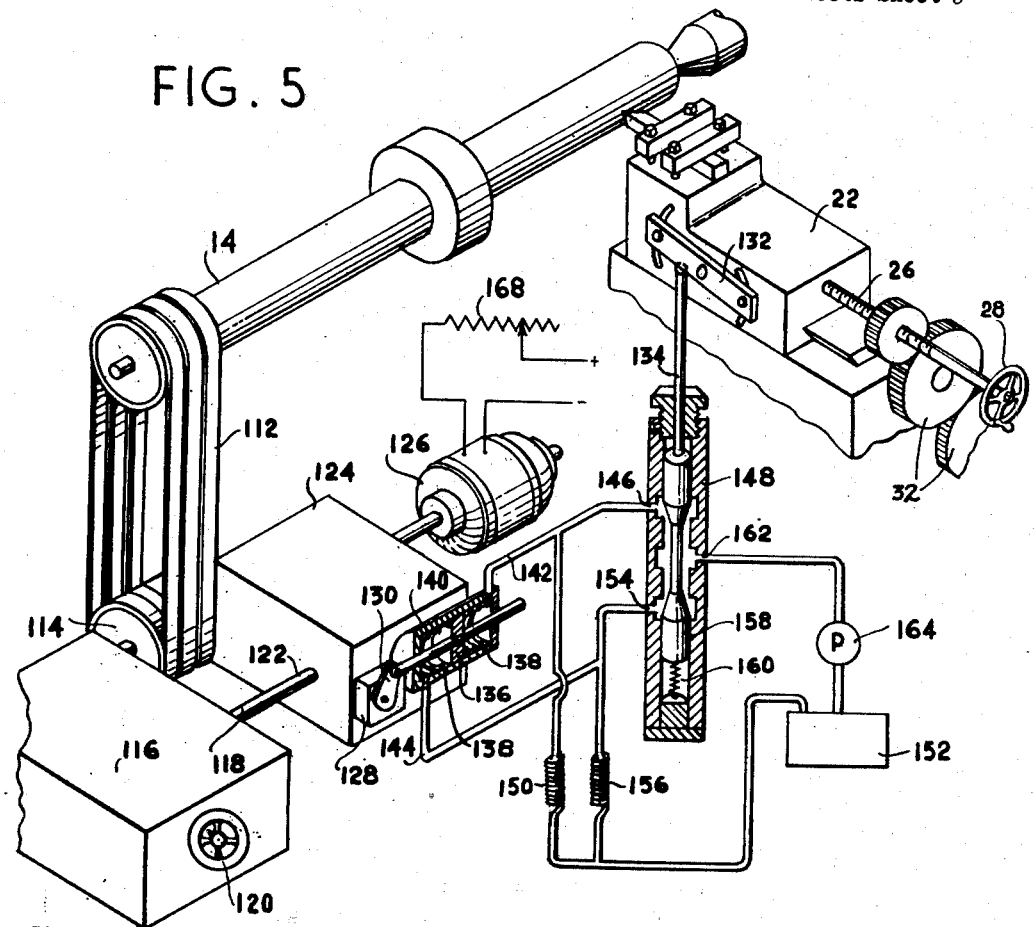
Figure 5 is still another modification of my invention wherein the position of the cross-slide directly controls a mechanical transmission through fluid operable means and in which the speed of the electric drive motor may be manually adjusted and in which there is also a second mechanical transmission that is manually adjustable.

In the arrangement shown in Figure 5, the spindle 14 is driven by the belts 112 from the output pulley 114 of the variable speed transmission 116, the input shaft of which is shown at 118. The variable speed transmission at 116 provides for a plurality of speed ratios between the shaft 118 and the pulley 114 and is adjustable by the handwheel at 120.

The input shaft 118 of the transmission 116 is coupled with the output shaft 122 of the variable transmission 124, the input shaft of which is connected to be driven by the variable speed electric motor 126. The transmission 124 is adjustable by a means indicated at 128 which includes a lever 130 which, when shifted, varies the speed ratio between the driving motor 126 and the output shaft 122. Preferably, the transmission 124 is infinitely adjustable as is the transmission shown at 82 in Figure 4.

The workpiece carried in the spindle 14 is cut by a tool carried in the cross-slide 22 which, as before, is adjustable by means of the cross-slide screw 26. Similarly to the cross-slide indicated in Figure 4, the cross slide in Figure 5 carries an adjustable cam or sine bar 132 which bears on the upper end of a member 134. In response to the reciprocation of the cross-slide 22, the cam 132 moves the member 134 in a vertical direction.

The lever 130 of the transmission 124 is connected with a double acting piston 136 which is normally urged into an intermediate position by the springs 138. The piston reciprocates in a cylinder 140 which has connected at one end a conduit 142 and at the other end a conduit 144. The conduit 142 connects with a port 146 in the valve 148 and also through a fixed restriction 150 with a fluid reservoir 152. The conduit 144 is connected with the port 154 in the valve 148 and also through the fixed restriction 156 to the reservoir 152.

The ports 146 and 154 in the valve 148 are adapted for being variably restricted by the valve member 158 which is urged upwardly by the spring 160 and downwardly by the member 134. Fluid at a predetermined pressure is supplied to the inlet port 162 of the valve by a pump 164 which draws fluid from the reservoir 152. When the valve member 158 is centered in the valve 148, then equal flow takes place through the restrictors 150 and 156 and equal pressures are conducted into the conduits 142 and 144 to opposite sides of the piston 136. At this time, the piston is balanced and the springs 138 urge it into a centered position. If the valve member 158 is moved in either direction from its center position then one of the ports 146, 154 is restricted to a greater degree and the other thereof to a lesser degree so that the flow through the restrictors 150 and 156 is varied in inverse ratio. This varies the pressures on the opposite sides of the piston 136 and the said piston moves against the thrust of one of the centering springs 138 to take up a new position of balance, in which position the transmission 124 is adjusted to operate at a different speed.

The motor 126 may have connected in circuit therewith a rheostat 168 which is adjustable to vary the speed of the said motor between predetermined limits.

In operation, the initial speed of the spindle 14 is determined by the setting of the transmission 116 and the motor 126. The cam or sine bar 132 is adjusted to the proper position to give the desired change in speed of the spindle per unit movement of the cross-slide 22 and the drive motor 126 is energized. Thereafter, as the cross-slide 22 moves radially of the workpiece, the valve member 158 is adjusted by the cam 132 and the transmission 124 is varied by the movement of the piston 136 in response to the variable flow conditions from the ports 146 and 154. By providing the transmission 116 and the variable speed motor 126, a wide range of speeds may be selected for the spindle 14 without requiring the transmission 124 to be variable throughout the range of speeds required. By providing the adjustable cam 132, the change in spindle speed per unit of movement of the cross-slide may be adjusted in order to maintain optimum turning conditions between the tool and the workpiece.

As in the case of the arrangements shown in Figures 3 and 4, the cross-slide screw 26 may be driven manually or by power means by the provision of a suitable clutch member.

Figure 6:
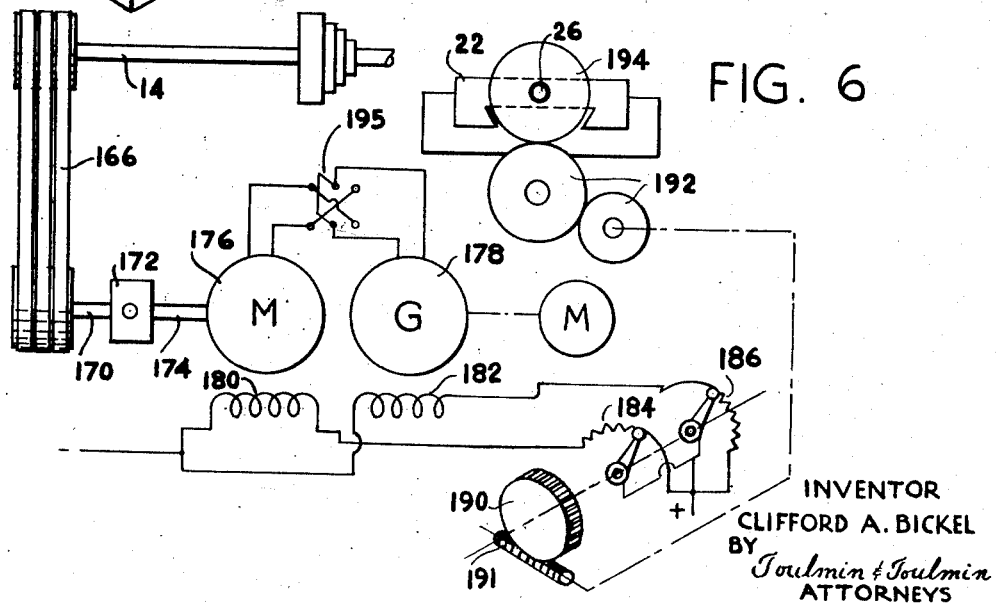
Figure 6 is a view illustrating means for adjusting the speed of a spindle drive motor by adjusting the field strengths of the said motor and a generator which supplies power thereto.

In Figure 6, there is shown an arrangement in which the spindle 14 is driven by the belts 166 from the output shaft 170 of the variable speed transmission 172. The input shaft 174 of the transmission 170 is driven by a motor 176 which is supplied with electrical energy from a generator 178. The motor has a field winding 180 and the generator has a field winding 182, the currents through the said windings being adjusted by the resistors 184 and 186, respectively. The resistors 184 and 186 have their movable elements connected together and to a worm wheel 190. The worm wheel 190 is driven by a worm 191 that is connected through a gear train 192 with the gear 194 connected with the screw 26 of the cross-slide 22. In response to rotation of the screw 26 to adjust the cross-slide 22, the rheostats 184 and 186 are adjusted to vary the relative strengths of the fields of the motor and generator. The resistors 184 and 186 are arranged so that at maximum motor speed the generator field is at a maximum and the motor field is at a minimum. As the motor speed is reduced, the motor field is first increased to a predetermined value and thereafter maintained constant while the generator field is reduced. The resulting curve of motor speed versus rheostat adjustment is such that if linear resistors are used, the surface speed of the workpiece is substantially constant without employing nonlinear gear ratios between the screw 26 and the worm wheel 190. The spindle may be reversed by mechanical means or by reversing the motor as by the switch indicated by the numeral 195.

As in the case of the modifications of Figures 3 through 5, the transmission at 172 permits the speed ratio between the spindle 14 and the shaft 174 to be varied so that the speed adjustment of the said spindle lies in the desired range.

Figure 7:
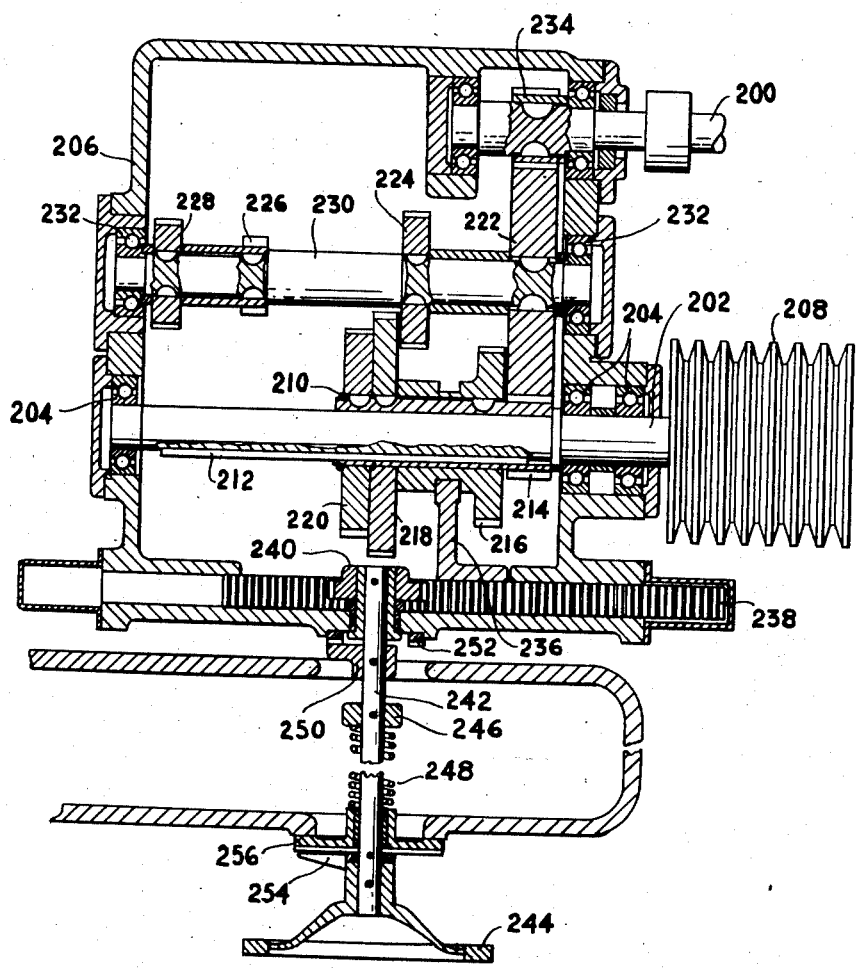
Figure 7 is a detailed view showing the construction of a geared transmission adapted for use in connection with any of the arrangements shown in Figures 3 through 6.

While any of several well known types of variable speed transmissions may be employed as at 58 in Figure 1, at 116 in Figure 5 and at 172 in Figure 6, I prefer to employ the construction illustrated in Figure 7.

In Figure 7, there is a variable speed transmission having an output shaft 200 and an input shaft 202. The input shaft 202 is journaled on suitable anti-friction bearings 204 in the casing 206 and may support a driving sheave 208 which is driven by belts from a source of power. The shaft 202 slidably supports a sleeve 210 within the casing which is keyed as by the key 212 to the shaft 202 to be driven thereby. Keyed to the sleeve 210 or integral therewith are a plurality of gears 214, 216, 218 and 220. These gears are adapted for meshing, respectively, with the gears 222, 224, 226 and 228 which are keyed to the shaft 230. The shaft 230 is supported in the casing 206 on the anti-friction bearings 232.

The gear 222 on the shaft 230 meshes with a gear 234 that is keyed to the output shaft 200.

For shifting the sleeve 210 along the shaft 202, there is provided the shifting fork 236 which is fastened to a rack 238 reciprocably mounted in a suitable track in the casing 206. For reciprocating the rack 238 to accomplish a change of speed ratio between the shafts 202 and 230, there is provided a gear 240 which is pinned to a shaft 242 extending to the outside of the case and having a handwheel 244. Also pinned to the shaft 242 is a collar 246 between which and the casing there bears a spring 248 tending to urge the said shaft inwardly of the casing. Also, pinned to the shaft is a clutch member 250 that has teeth thereon which engage the teeth on a ring 252 rigidly carried by the casing. When it is desired to shift the rack 238 to engage a different pair of gears, the handwheel 244 is pulled outwardly from the machine to disengage the members 250 and 252 and thereafter the handwheel is rotated until the pointer 254 indicates the gear ratio desired on the dial 256. When the proper gear ratio or speed is indicated, the handwheel 244 is released and the members 250 and 252 re-engage to lock the transmission in that particular setting.

It will be apparent that this invention provides a means of adjusting the spindle speed in a lathe or similar machine in response to the movement of the tool carrying member radially of the workpiece. The speed adjustment may be made linearly or non-linearly depending on the particular arrangement of controlled elements. There is further provided means of adjusting the speed range of the spindle so that the surface speed may be relatively high or relatively low as desired.

According to the preferred form of this invention, there are provided both electrical and mechanical means which are adjustable to provide for the change of speed of the spindle. In addition, the control of spindle speed is effected whether the cross-slide is reciprocated manually or by power means such as a feed rod.

This application is an improvement on my Patent No. 2,389,757, issued November 27, 1945, entitled "Apparatus for Operating Lathes."

It will be understood that this invention is susceptible to modification in order to adopt it to different usages and conditions and, accordingly, it is desired to comprehend such modifications within this invention as may fall within the scope of the appended claims.

I claim:

1. In a lathe, the combination of a spindle for receiving and rotating a workpiece, a cross slide, means including a power-driven feed rod and manually operable means for moving said cross slide to and from the axis of rotation of said spindle for normal and conventional operation of said cross slide, a variable speed transmission, adjustable cam means carried by said cross slide, cam follower means for varying the speed ratio of said transmission, a variable speed electric motor for driving said spindle, energizing means for energizing said electric motor, a rheostat for varying the energization supplied from the energization means to the motor for varying the speed thereof, drive means including said variable speed transmission for driving said spindle from said variable speed electric motor, and linkage means for controlling the actuation of said rheostat from said cam follower means to thus vary the speed of the spindle both by varying the amount of energization supplied to said electric motor and by varying the speed ratio of said transmission.

2. In a lathe, the combination of a spindle for receiving and rotating a workpiece, a cross slide, means including a power-driven feed rod and manually operable means for moving said cross slide to and from the axis of rotation of said spindle for normal and conventional operation of said cross slide, a change gear transmission for driving said spindle, a variable speed transmission for driving said change gear transmission, a variable speed electric motor for driving said variable speed transmission, control means for regulating the speed ratio of said variable speed transmission and thus the speed of said spindle, fluid servomotor means for actuating said control means, a fluid valve for controlling the fluid servomotor means, adjustable cam means carried by said cross slide, and cam follower means operable by said cam means for actuating said fluid valve means and hence varying the speed of said spindle upon movement of said cross slide relative to the axis of rotation of said workpiece.

3. In a lathe, the combination of a spindle for receiving and rotating a workpiece, a cross slide, means including a power-driven feed rod and manually operable means for moving said cross slide to and from the axis of rotation of said spindle for normal and conventional operation of said cross slide, a variable speed transmission, adjustable cam means carried by said cross slide, cam follower means movable upon movement of said slide, a variable speed electric motor, energizing means for energizing said electric motor, drive means including said variable speed transmission for driving said spindle from said variable speed electric motor, and linkage means for actuating said transmission from said cam follower means to thus vary the speed of the spindle.

4. In a machine tool having a work holder and a tool holder, one of said holders being revoluble and the other of said holders being movable toward and from the rotational axis of said one of said holders, and having power means to rotate said revoluble holder, the provision of a constant surface cutting speed mechanism, including a variable speed transmission, adjustable cam means carried by said translatable element for movement therewith, cam follower means movable upon movement of said slide, said power means being a variable speed electric motor, energizing means for energizing said electric motor, a rheostat for varying the energization supplied from the energization means to the motor for varying the speed thereof, drive means including said variable speed transmission for driving said revoluble holder from said electric motor, and linkage means for actuating one of said rheostat and said transmission from said cam follower means to thus vary the speed of said revoluble holder.

5. In a lathe, the combination of a spindle for receiving and rotating a workpiece, a cross slide, means including a power-driven feed rod and manually operable means for moving said cross slide to and from the axis of rotation of said spindle for normal and conventional operation of said cross slide, a variable speed transmission, adjustable cam means carried by said cross slide, cam follower means movable upon movement of said slide, a variable speed electric motor, energizing means for energizing said electric motor, a rheostat for varying the energization supplied from the energization means to the motor for varying the speed thereof, drive means including said variable speed transmission for driving said spindle from said variable speed electric motor, and linkage means for actuating one of said rheostat and said transmission from said cam follower means to thus vary the speed of the spindle.

6. In a machine tool having a work holder and a tool holder, one of said holders being revoluble and the other of said holders being movable toward and from the rotational axis of said one of said holders, the provision of a constant surface cutting speed mechanism, including a variable speed transmission, a variable speed electric motor for driving said revoluble holder through said variable speed transmission, control means for regulating the speed ratio of said variable speed transmission and thus the speed of said revoluble holder, fluid servomotor means for actuating said control means, a fluid valve for controlling the fluid servomotor means, adjustable cam means carried by said other of said holders, and cam follower means operable by said cam means for actuating said fluid valve means and hence varying the speed of said revoluble holder upon movement of said other of said holders relative to the axis of rotation of said rev- 7. In a machine tool having a work holder and a tool holder, one of said holders being revoluble and the other of said holders being movable toward and from the rotational axis of said one of said holders, the provision of a constant surface cutting speed mechanism, including, a change gear transmission for driving said revoluble holder, a variable speed transmission for driving said change gear transmission, a variable speed electric motor for driving said variable speed transmission, control means for regulating the speed ratio of said variable speed transmission and thus the speed of said revoluble holder, fluid servomotor means for actuating said control means, a fluid valve for controlling the fluid servomotor means, adjustable cam means carried by said other of said holders, and cam follower means operable by said cam means for actuating said fluid valve means and hence varying the speed of said revoluble holder upon movement of said other of said holders relative to the axis of rotation of said revoluble holder.

8. In a machine tool, the combination of a spindle, a slide, means for moving said slide to and from the axis of rotation of said spindle, a variable speed transmission, a variable speed electric motor for driving said spindle through said variable speed transmission, control means for regulating the speed ratio of said variable speed transmission and thus the speed of said spindle, fluid servomotor means for actuating said control means, a fluid valve for controlling the fluid servomotor means, adjustable cam means carried by said slide, and cam follower means operable by said cam means for actuating said fluid valve means and hence varying the speed of said spindle upon movement of said slide relative to the axis of rotation of said spindle.

9. In a machine tool, the combination of a spindle, a slide, means for moving said slide to and from the axis of rotation of said spindle, a change gear transmission for driving said spindle, a variable speed transmission for driving said change gear transmission, a variable speed electric motor for driving said variable speed transmission, control means for regulating the speed ratio of said variable speed transmission and thus the speed of said spindle, fluid servomotor means for actuating said control means, a fluid valve for controlling the fluid servomotor means, adjustable cam means carried by said slide, and cam follower means operable by said cam means for actuating said fluid valve means and hence varying the speed of said spindle upon movement of said slide relative to the axis of rotation of said spindle.

CLIFFORD A. BICKEL.

REFERENCES CITED

The following references are of record in the file of this patent:

UNITED STATES PATENTS

| Number | Name | Date |
| --- | --- | --- |
| 1,896,052 | Ferris | Jan. 31, 1933 |
| 1,915,986 | Ferris | June 27, 1933 |
| 2,004,283 | Hurt | June 11, 1935 |
| 2,150,032 | Herman | Mar. 7, 1939 |
| 2,209,037 | Riegger | July 23, 1940 |
| 2,389,757 | Bickel | Nov. 27, 1945 |

FOREIGN PATENTS

| Number | Country | Date |
| --- | --- | --- |